US005624473A

United States Patent [19]
Farkas et al.

[11] Patent Number: 5,624,473
[45] Date of Patent: Apr. 29, 1997

[54] AUTOMATED CONTROLLER FOR GLASSWARE MANUFACTURE WITH ELECTRONICALLY LABELED MANUAL MODE PANEL SWITCHES

[75] Inventors: Daniel S. Farkas, Maumee; D. Wayne Leidy, Perrysburg, both of Ohio

[73] Assignee: Owens-Brockway Glass Container Inc., Toledo, Ohio

[21] Appl. No.: 235,817

[22] Filed: Apr. 29, 1994

[51] Int. Cl.$^6$ ................................................ G05B 19/10
[52] U.S. Cl. ...................... 65/158; 65/29.11; 65/DIG. 13
[58] Field of Search .................... 65/29.1, 29.11, 65/158, 160, 163, DIG. 13; 364/473, 476; 345/141, 142, 173, 192

[56] References Cited

U.S. PATENT DOCUMENTS

| | | | |
|---|---|---|---|
| 4,100,937 | 7/1978 | Mallory | 137/596.16 |
| 4,141,711 | 2/1979 | Zabor | 65/29 |
| 4,145,204 | 3/1979 | Farkas et al. | 65/164 |
| 4,145,205 | 3/1979 | Farkas et al. | 65/164 |
| 4,152,134 | 5/1979 | Dowling et al. | 65/163 |
| 4,338,115 | 7/1982 | Farkas | 65/29 |
| 4,338,116 | 7/1982 | Huff et al. | 65/29 |
| 4,339,260 | 7/1982 | Johnson et al. | 65/160 |
| 4,362,544 | 12/1982 | Mallory | 65/163 |
| 4,364,764 | 12/1982 | Farkas et al. | 65/29 |
| 4,369,052 | 1/1983 | Hotmer | 65/160 |
| 4,375,669 | 3/1983 | Johnson et al. | 364/473 |
| 4,394,148 | 7/1983 | Ryan | 65/159 |
| 4,400,192 | 8/1983 | Farkas | 65/29 |
| 4,459,146 | 7/1984 | Farkas et al. | 65/29 |
| 4,615,722 | 10/1986 | Steffan et al. | 65/58 |
| 4,762,544 | 8/1988 | Davey | 65/29 |
| 4,884,199 | 11/1989 | Boothroyd et al. | 364/408 |
| 5,121,113 | 6/1992 | Kedge et al. | 345/173 |
| 5,345,389 | 9/1994 | Calvin et al. | 364/473 |

FOREIGN PATENT DOCUMENTS 628520  12/1994  European Pat. Off. .

OTHER PUBLICATIONS

"I.S. Goes, I.C," *The Glass Industry*, May 1974, pp. 8–10 and 32.
Database: Patent Abstracts of Japan, vol. 18, No. 289 (M–1614), Class B29C, JP 6055596, (Kenji), abstract, Mar. 1994.

*Primary Examiner*—Donald E. Czaja
*Assistant Examiner*—Sean Vincent

[57] ABSTRACT

A glass production system that includes a glass forming machine having a multiplicity of operating mechanisms for converting gobs of molten glass into glassware, a plurality of solenoid valves responsive to valve drive signals for operating the multiplicity of operating mechanisms, and an electronic controller for generating the valve drive signals to operate the mechanisms in sequence to produce the glassware. The electronic controller includes an operator panel having a plurality of electronic switches responsive to an operator in a manual mode of operation for generating valve drive signals to operate selected ones of the mechanisms associated with the individual switches. A plurality of electronic displays are disposed on the operator panel each adjacent to an associated one of the electronic switches, and are responsive to the controller for displaying to an operator the operating mechanism of the machine associated with the adjacent switch during the manual mode of operation.

7 Claims, 4 Drawing Sheets

AUTOMATED CONTROLLER FOR GLASSWARE MANUFACTURE WITH ELECTRONICALLY LABELED MANUAL MODE PANEL SWITCHES

The present invention is directed to manufacture of glassware such as hollow glass containers, and more particularly to a method and system for control of an individual section machine.

BACKGROUND AND OBJECTS OF THE INVENTION

The art of glass container manufacture is currently dominated by the so-called individual section or IS machine. Such machines comprise a plurality of separate or individual manufacturing sections, each of which includes a multiplicity of operating mechanisms for converting gobs of molten glass into hollow glass containers. In general, each section includes a parison mold in which a glass gob is initially formed in a blowing or pressing operation, an invert arm of transferring the parison to a blow mold in which the container is blown to final form, and tongs for removing the container for transfer to an annealing lehr. Additional mechanisms provide for closure of mold halves, movement of baffles and blowing nozzles, control of mold cooling wind, etc. U.S. Pat. No. 4,362,544 includes a comprehensive background discussion of the art of both blow-and-blow and press-and-blow glassware forming processes, and also discloses an electropneumatic individual section machine adapted for use in either process.

Initially, the operating mechanisms of each machine section were operated by pneumatic valves carried by a valve block and responsive to cams mounted on a timing shaft coupled to the machine. Synchronism among the mechanisms within each section, and among the various sections of the machine, was therefore controlled by the timing shaft and the valve drive cams. U.S. Pat. No. 4,152,134 discloses an improved control arrangement in which a machine supervisory computer (MSC) is connected to a plurality of individual section computers (ISC), each associated with a corresponding section of the IS machine. Each individual section computer is connected through an associated section operator console (SOC) to solenoid valves in an electropneumatic valve block, which are individually responsive to electronic valve control signals from the section computer and operator console for controlling operation of the associated section operating mechanisms. A timing pulse generator is connected to the machine supervisory computer and to the individual section computers for synchronizing operation within and among the individual sections. The individual section computer and the section operator console illustrated in the noted patent were subsequently combined in a computerized section operator console (COM-SOC, a trademark of applicant's assignee).

The computerized section operator consoles (COM-SOCs) of each IS machine are mounted on a wireway in the frame at each machine section, as shown for example in U.S. Pat. Nos. 4,339,260 and 4,362,544. Each COM-SOC unit has an operator panel with displays for indicating machine section status, and a multiplicity of toggle switches for selectively operating various mechanisms of the machine section during a manual mode of operation. That is, during set-up or maintenance, a machine section may be selectively placed in a manual mode of operation, and various operating mechanisms of the machine section may be selectively operated by manipulation of the toggle switches on the COM-SOC operator panel. The function or operating mechanism associated with each switch is labeled adjacent to the switch, usually by means of a language display, or by an icon so that the panel may be employed in many countries. The number of manual mode toggle switches is much less than the number of valve drivers, solenoid valves and operating mechanisms—e.g., ninety-six solenoid valves and valve drivers versus twenty manual mode toggle switches. Thus, current COM-SOC units include facility for reprogramming individual switches to operate differing mechanisms. In this situation, plastic or metal overlays are positioned over the switches to identify the switches with specific operating mechanisms. However, such overlays can become lost or misplaced, and inherently limit flexibility of switch programming in the manual operating modes.

It is a general object of the present invention to provide a system and method for control of glass production that alleviate some or all of the problems and difficulties hereinabove set forth. Another and more specific object of the present invention is to provide a system and method of the described character that include facility for selectively electronically labeling the manual mode toggle switches, thereby eliminating the need for overlays and templates in the prior art, enabling the use of alphanumeric labels rather than icons in any desired language, and/or providing enhanced flexibility for programming individual switches to perform specific functions. Yet another object of the present invention is to provide a system and method for electronically labeling the manual mode toggle switches as described above in which the switch labels are blanked during a run mode of operation, and/or which provide facility for labeling individual switches during the run mode of operation to disable a solenoid valve driver and associated mechanism if desired.

SUMMARY OF THE INVENTION

A glass production system includes a glass forming machine having a multiplicity of operating mechanisms for converting gobs of molten glass into glassware, a plurality of solenoid valves responsive to valve drive signals for operating the multiplicity of operating mechanisms, and an electronic controller for generating the valve drive signals to operate the mechanisms in sequence to produce the glassware. The electronic controller includes an operator panel having a plurality of electronic switches responsive to an operator in a manual mode of operation for generating valve drive signals to operate selected ones of the mechanisms associated with the individual switches. A plurality of electronic displays are disposed on the operator panel each adjacent to an associated one of the electronic switches, and are responsive to the controller for displaying to an operator the operating mechanism of the machine associated with the adjacent switch during the manual mode of operation.

The controller is selectively programmable to vary association of each of the manual mode switches with the operating mechanisms of the glassware forming machine, and the electronic switch labels are reprogrammable for changing the switch labels accordingly. Electronic memory in the controller has display character fonts prestored therein for selective retrieval to drive the displays through an electronically programmable logic device. The memory includes facility for varying the character fonts so that the labeling can be displayed in any language, and so that the display can be steady state or blinking. During a run mode of operation, a manual mode switch may be programmed to deactivate a solenoid valve, and the associated mechanism is indicated at the display.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
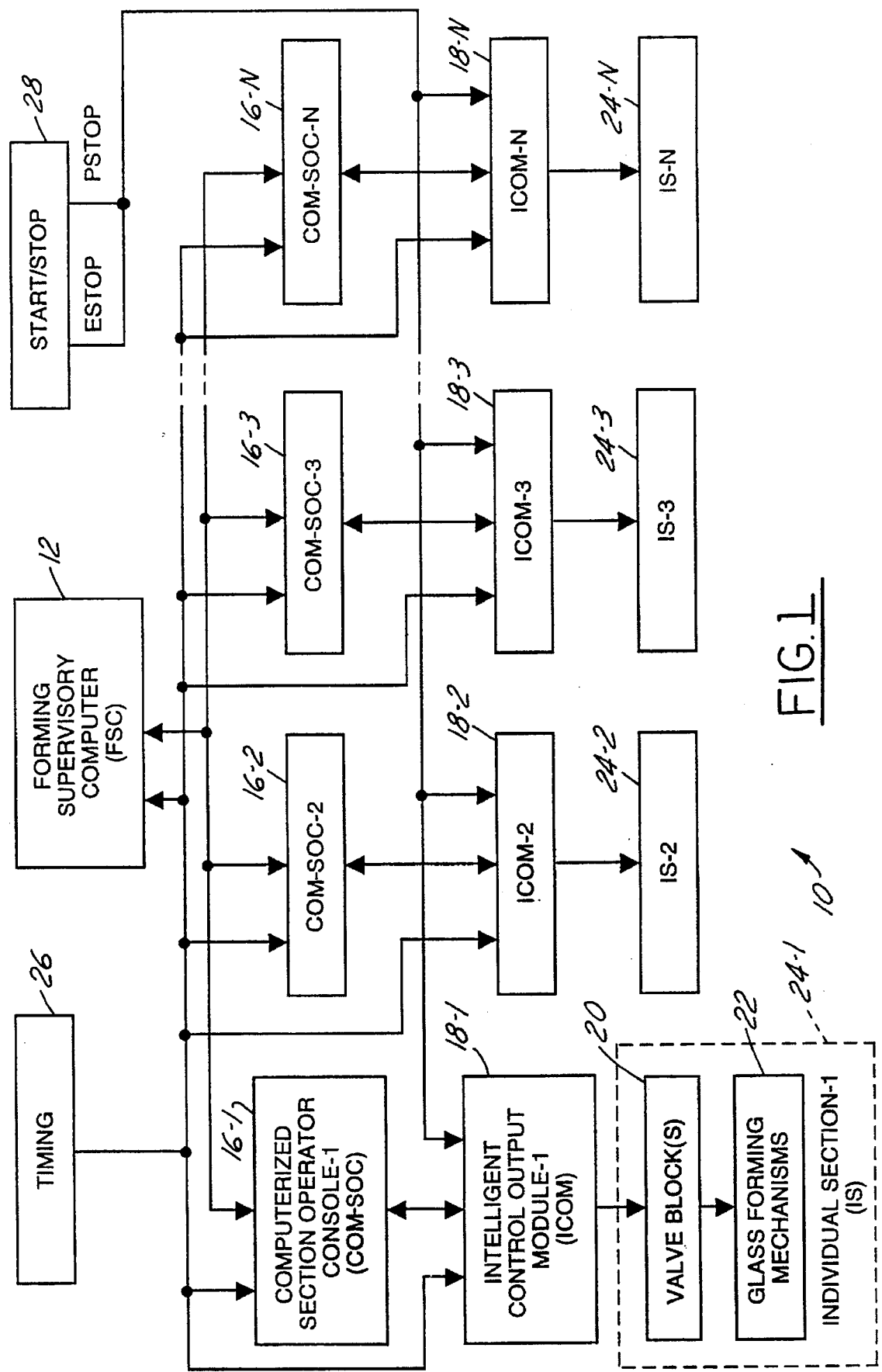
FIG. 1 is a functional block diagram of a glassware production system in accordance with a presently preferred embodiment of the invention.

FIG. 1 illustrates a glassware production system 10 in accordance with a presently preferred embodiment of the invention as comprising a forming supervisory computer (FSC) 12 connected by an ethernet bus 14 to a plurality of computerized section operator consoles (COM-SOCs) 16-1 through 16-N. (The trademark COM-SOC II is employed by applicant's assignee to refer to COM-SOCs 16-1 to 16-N, to distinguish the same from the earlier COM-SOC units.) Each COM-SOC 16-1 through 16-N is connected to an associated intelligent control output module (ICOM) 18-1 through 18-N for providing programming and control information to the ICOM, and receiving operating data therefrom. Each ICOM 18-1 through 18-N provides drive signals to the multiple solenoid valves of one or more associated valve blocks 20, which in turn function to control operation of the glass forming mechanisms 22 of an associated individual section 24-1 through 24-N of an IS machine. FSC 12, COM-SOCs 16-1 through 16-N and ICOMs 18-1 through 18-N receive timing signals from a timing pulse generator 26. A start/stop circuit 28 also provides signals to each ICOM 18-1 through 18-N indicative of an emergency stop situation (ESTOP) and a programmed stop situation (PSTOP). Start/stop 28 may comprise remote operator console units associated with each individual section, an operator start/stop circuit for the entire machine, or most preferably both. Valve block 20 is illustrated, for example, in U.S. Pat. No. 4,100,937. Circuits suitable for use in timing pulse generator 26 are disclosed in U.S. Pat. Nos. 4,145,204, 4,145,205 and 4,400,192.

Figure 2:
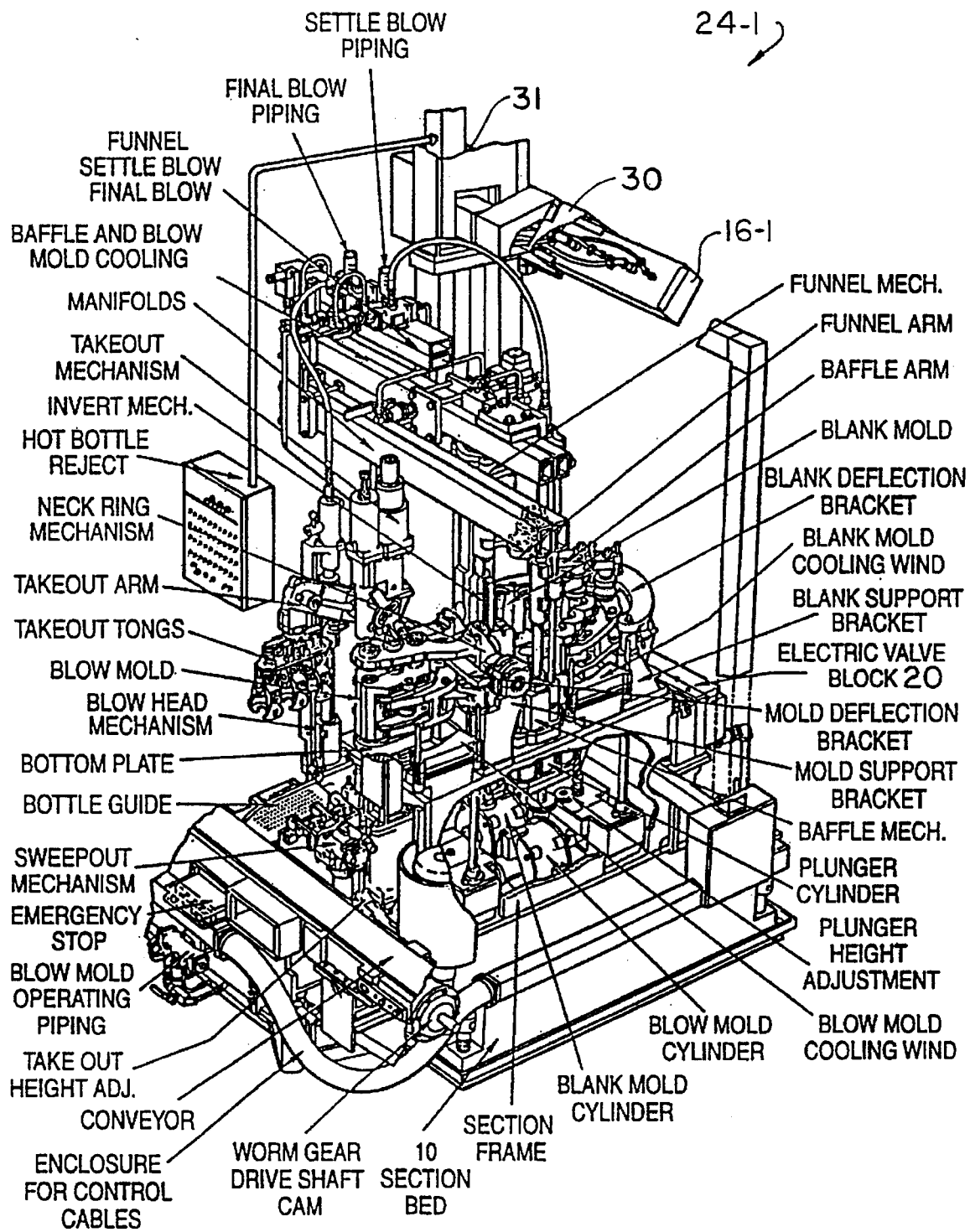
FIG. 2 is a perspective view that illustrates the major operating mechanisms of a single section in a triple-gob IS glass container forming machine in which the present invention may be employed.

FIG. 2 illustrates the major operating mechanisms of a single section 24-1 of an IS machine, which is described in greater detail in U.S. Pat. No. 4,362,544. Such machine section includes the electropneumatic valve block assembly 20, and is constructed to perform both blow-and-blow and press-and-blow manufacturing processes in differing modes of operation. COM-SOC 16-1 is mounted on a cooling air plenum 30, through which air is driven to cool the COM-SOC electronics. COM-SOC 16-1 is connected by a cable to associated ICOM 18-1 mounted in a junction box 31 on the side of the IS machine frame. Valve driver circuits in ICOM 18-1 are connected by a multiple-conductor cable to associated solenoid valves in one or more valve blocks 20, which may be mounted at the bottom of the machine frame as shown in FIG. 2 or at the top, or both. ICOMs 18-1 through 18-N are identical to each other, and are illustrated in greater detail in application Ser. No. 08/235,816 filed Apr. 29, 1994, now U.S. Pat. No. 5,580,366 by the inventor herein, assigned to the assignee hereof, and incorporated herein by reference.

Figure 3:
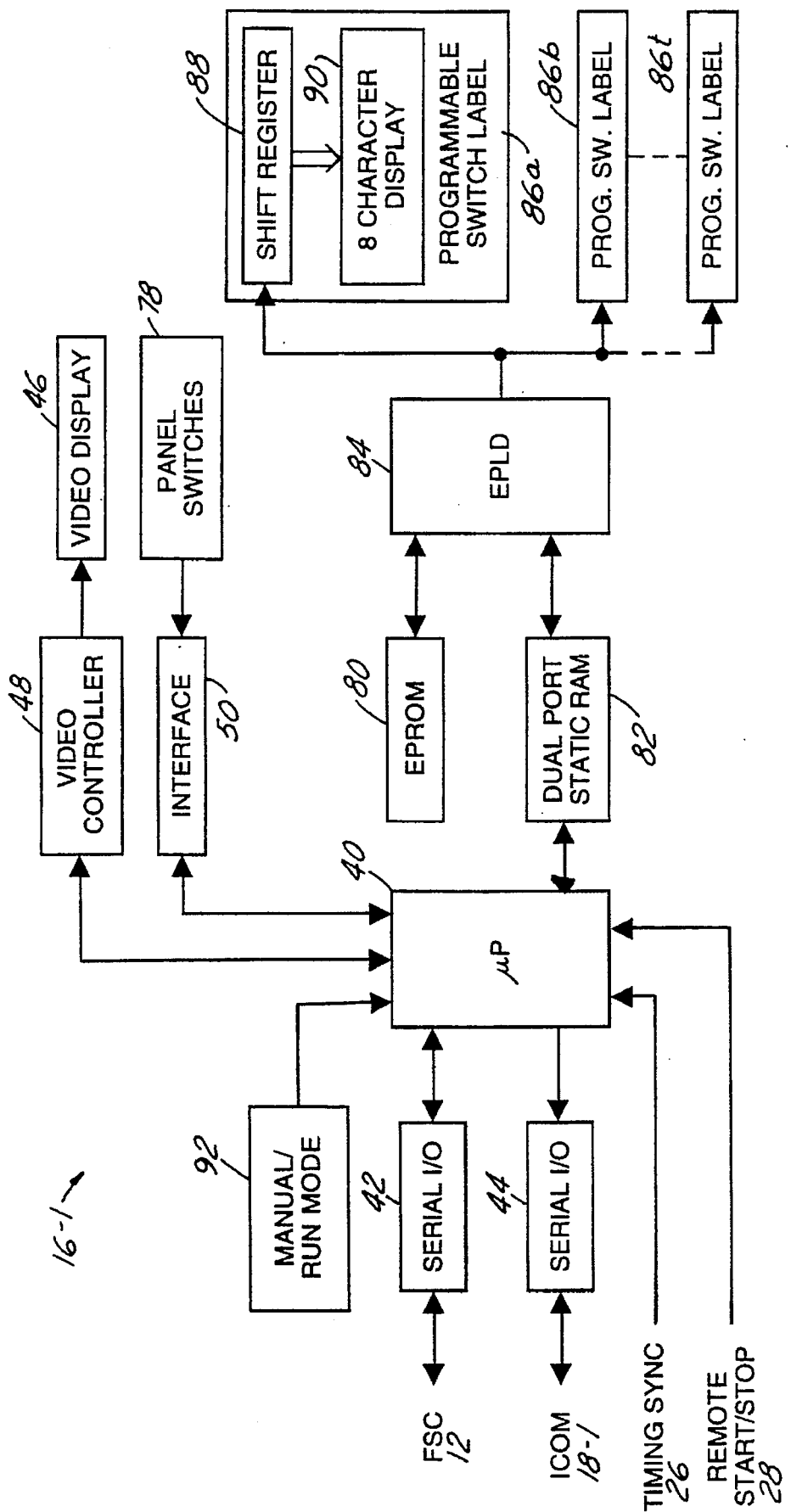
FIG. 3 is a more detailed functional block diagram of the computerized section operator consoles (COM-SOCs) illustrated in FIGS. 1 and 2.
Figure 4:
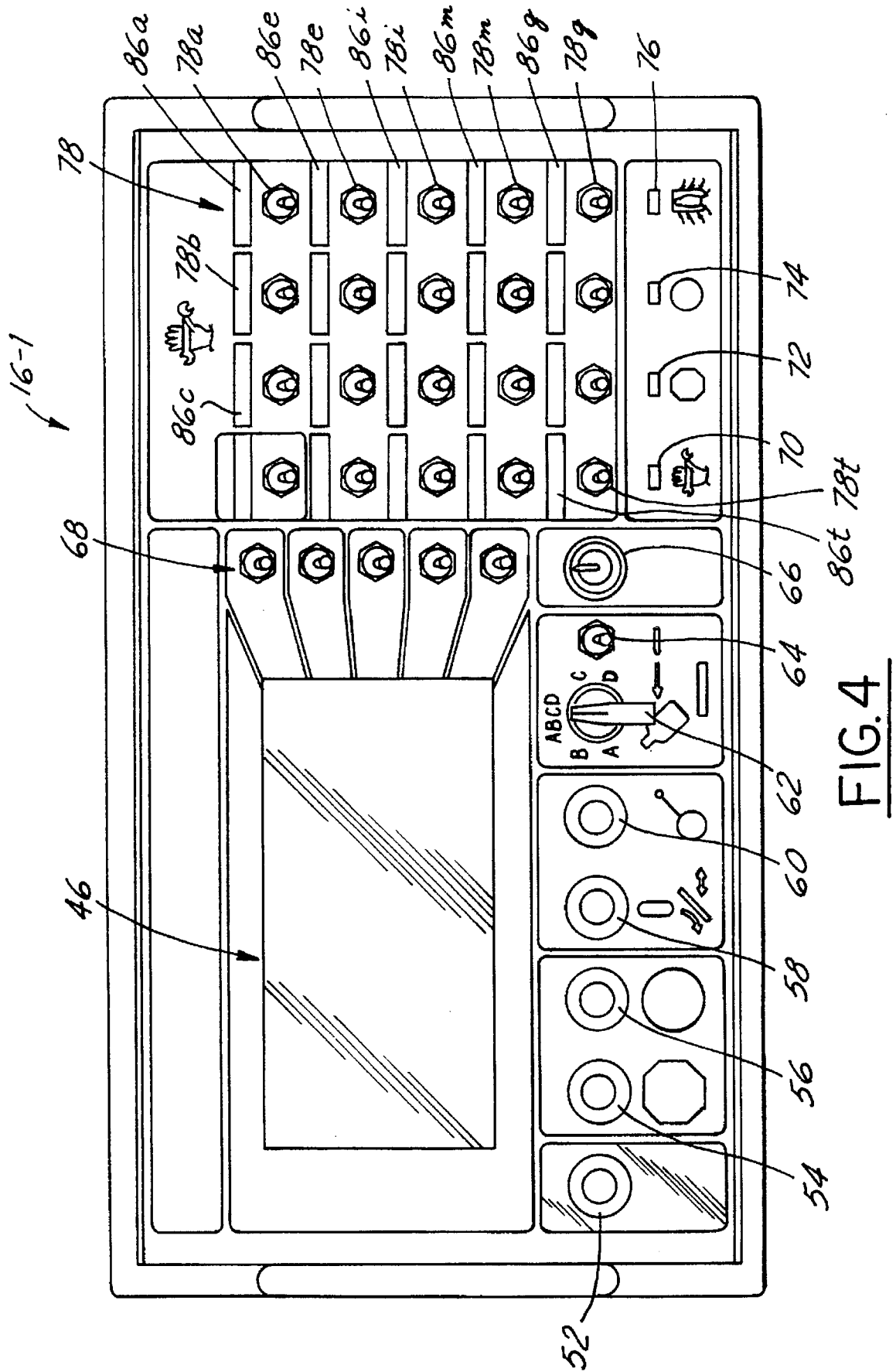
FIG. 4 is a front elevational view of the COM-SOC unit illustrated in FIG. 3 featuring a detailed illustration of the operator panel.

COM-SOC 16-1 is illustrated in FIG. 3, COM-SOCs 16-2 through 16-N being identical thereto. A microprocessor 40 is connected by a serial I/O port 42 to FSC 12 through ethernet 14 (FIG. 1) for receiving control information from FSC 12 and returning management reporting and status information to the FSC. Microprocessor 40 is also connected to its associated ICOM 18-1 through a second serial I/O port 44, and receives timing sync and remote start/stop signals from the associated circuits 26,28 illustrated in FIG. 1. COM-SOC 16-1 has a video display 46 (FIGS. 3 and 4) connected to microprocessor 40 through a video controller 48. The operator panel of COM-SOC 16-1 has multiple panel switches connected to microprocessor 40 through an interface 50. Referring to FIG. 4, these panel switches include an emergency stop push-button 52, a programmed stop push-button 54, a start push-button 56, a gob reject/load push-button 58, a swab command push-button 60, and hot ware reject switches 62,64. These switches have adjacent icons associated therewith for indicating the functions permanently assigned to these switches. Switch 62 is a rotary switch for selecting ware to be rejected, and switch 64 is a momentary toggle switch for performing the reject operation. A key switch 66 limits operator access to the control functions of COM-SOC 16-1. A series 68 of momentary contact switches are arrayed along the side edge of display 46 for selecting programming and control functions according to options indicated at the display. The COM-SOC operator panel also includes display lamps 70, 72, 74, 76 with adjacent icons for indicating a manual mode condition, a stop condition, a run mode condition and presence of mold cooling wind respectively.

An array 78 of manual mode toggle switches are disposed in a row-and-column array at the right edge of the COM-SOC operator panel, and are connected to microprocessor 40 through interface 50 (FIG. 3). During a manual mode of operation, switches 78 function in cooperation with microprocessor 40 (FIG. 3) to send control signals to ICOM 18-1 through serial I/O port 44 to energize a solenoid valve that is preprogrammed to be associated with the particular switch 78, and thereby activate a machine operating mechanism likewise associated with the switch 78. For example, switch 78a in FIG. 4 may be associated with activation of the invert mechanism in FIG. 2 in one direction, while switch 78b may be associated with activating the invert mechanism in the opposite direction.

Returning to FIG. 3, microprocessor 40 is coupled to a dual port static RAM 82. An electronically programmable logic device (EPLD) 84 is coupled to an EPROM 80 and RAM 82. EPLD 84 has an output connected to a plurality of programmable switch labels 86a–86t, one such label being positioned immediately above and adjacent to each manual mode toggle switch 76a–76t on the COM-SOC panel, as shown in FIG. 4. Each programmable switch label 86a–86t includes a shift register 88 for receiving characters to be displayed serially from EPLD 84, and an eight-character display 90 for displaying the characters so loaded in the associated shift register 88. Thus, there is disposed adjacent to each manual mode toggle switch 78a–78t an associated programmable electronic switch label 86a–86t for indicating to an operator the function of the adjacent switch.

Microprocessor 40 also receives an input 92 for selecting between manual and run modes of operation. Input 92 may come from one of the panel switches 68 by selection of a run or manual operating mode upon inquiry at display 46, or may be provided by remote switches. In a manual mode of operation selected at 92, microprocessor 40 is responsive to each switch 78a–78t for commanding ICOM 18-1 to energize a solenoid valve associated with the switch and thereby activate an operating mechanism likewise associated with the switch. For example, manual mode toggle switch 78a may be programmed to activate the invert mechanism (FIG. 2) in one direction during a manual mode of operation, and switch 78b may be programmed to activate the invert mechanism in the opposite direction. The functions associated with these switches, and all other switches 78c–78t, are displayed at the associated switch labels or displays 86a–86t. In the event that the function of a particular manual mode toggle switch is to be modified, such as for example changing the functions of switches 78a, 78b to activation or deactivation of the plunger cylinder (FIG. 2), such change in programming may be accomplished by downloading from FSC 12, or reprogramming of COM-SOC 16-1 by means of switches 68 and display 46. In such event, appropriate switch labeling is automatically retrieved from EPROM 80 or RAM 82, so that the electronic switch labeling automatically tracks the reprogrammed function of the adjacent switch.

EPLD 84 may comprise any suitable electronically programmable gate array, such as that marketed by Cypress of San Jose, Calif., Part No. C47C132-55DL. EPROM 80 may contain standard alphanumeric character fonts for access by EPLD 84 to drive switch labels 86a–86t. Alternatively, special characters or characters of a different language (from that stored in EPROM 80) may be downloaded into static RAM 82, and EPLD 84 commanded to obtain character information from static RAM 82. RAM 82 contains three areas used for character memory. The first two areas are used for standard characters, and EPLD addresses these areas alternately each time the display labels are refreshed. In this way, one or more characters at each display label may be made to blink by loading a desired character at a corresponding memory location in one area and a blank character at the same location in the other area. The desired display segments alternately displays the character and a blank. The third area of RAM 82 is used for special character fonts.

During a run mode of operation selected at 92, machine section 24-1 (FIGS. 1 and 2) would normally operate automatically to produce glassware. A run mode of operation would be indicated at 74 (FIG. 4), and all of the programmable switch labels 86a–86t would be blanked by microprocessor 40 and EPLD 84. If desired, one or more of the switches 78 can be programmed to function in a run mode of operation to inhibit activation of a solenoid valve, and thereby inhibit operation of the associated operating mechanism of the machine section. In this event, an alphanumeric identification of the associated mechanism and function is shown at the display label adjacent to the switch.

We claim:

1. A glass production system that includes a glass forming machine having a multiplicity of operating mechanisms for converting gobs of molten glass into glassware, solenoid valve means responsive to valve drive signals for operating said multiplicity of operating mechanisms, and electronic control means for generating said valve drive signals to operate said mechanisms in sequence to produce the glassware, said electronic control means including an operator panel having a plurality of manual electronic switch means responsive to an operator, a controller responsive to said switch means in a manual mode of operation when said operating mechanisms are otherwise inoperative for generating valve drive signals to manually initiate operation of selected ones of said operating mechanisms associated with said switch means, and means for identifying each of said switch means with an associated one of said operating mechanisms, characterized in that said identifying means comprises a plurality of electronic display means on said operator panel each adjacent to an associated one of said electronic switch means and responsive to said controller for displaying to the operator the one of said operating mechanisms of said machine associated with said adjacent switch means for activation by the operator in said manual mode of operation.

2. The system set forth in claim 1 wherein said controller includes means for selectively programming said controller to associate each of said switch means with a selected operating mechanism, including means for selectively varying such programmed association, and means for selectively electronically varying information displayed at each of said electronic display means in coordination with the programmed association of the adjacent manual electronic switch means with said selected operating mechanism.

3. The system set forth in claim 2 wherein said controller includes electronic memory means having display character fonts prestored therein, and means for selectively retrieving said prestored character fonts from said memory means for display at said display means.

4. The system set forth in claim 3 wherein said controller includes means for selectively varying said character fonts prestored in said memory means.

5. The system set forth in claim 4 wherein said electronic memory includes first and second sections, and wherein said controller includes means for accessing said sections alternately to refresh said display means.

6. The system set forth in claim 5 wherein said controller includes means for loading a blank character at one of said sections, such that a blinking character is displayed at said display means as said controller alternately accesses said first and second sections to refresh said display means.

7. The system set forth in claim 1 wherein said controller includes means for selecting between said manual mode of operation and a run mode of operation in which said controller automatically controls operation of said operating mechanisms, and in which said identifying means includes means for blanking said display means in said run mode of operation.

* * * * *